US007514493B1

(12) United States Patent
Moore et al.

(10) Patent No.: US 7,514,493 B1
(45) Date of Patent: Apr. 7, 2009

(54) STRIPPABLE CONTAINMENT AND DECONTAMINATION COATING COMPOSITION AND METHOD OF USE

(75) Inventors: Robert C. Moore, Edgewood, NM (US); Mark D. Tucker, Albuquerque, NM (US); Joseph A. Jones, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/974,222

(22) Filed: Oct. 27, 2004

(51) Int. Cl.
*C08F 283/00* (2006.01)
*C08K 3/20* (2006.01)
*C08L 29/04* (2006.01)
*B08B 7/00* (2006.01)
*B08B 3/00* (2006.01)
*C23G 1/02* (2006.01)
*B01D 15/00* (2006.01)
*C09K 3/18* (2006.01)

(52) U.S. Cl. .................... 524/457; 524/458; 524/503; 524/733; 524/779; 134/4; 134/26; 134/41; 210/666; 252/70; 252/626

(58) Field of Classification Search .............. 524/457, 524/458, 503, 733, 779; 134/4, 26, 41; 210/666; 252/70, 626
See application file for complete search history.

(56) References Cited

U.S. PATENT DOCUMENTS

| 2,611,756 | A | * | 9/1952 | Pockel ................ 524/563 |
| 3,985,728 | A | * | 10/1976 | Lin ..................... 536/120 |
| 4,325,744 | A | * | 4/1982 | Panayappan et al. ....... 134/4 |
| 4,332,690 | A | * | 6/1982 | Kimura et al. ........... 252/70 |
| 4,587,043 | A | | 5/1986 | Murray et al. |
| 4,814,373 | A | * | 3/1989 | Frankel et al. .......... 524/460 |
| 5,002,682 | A | * | 3/1991 | Bragg et al. ............ 510/311 |
| 5,205,864 | A | | 4/1993 | Snyder |
| 5,421,897 | A | * | 6/1995 | Grawe .................. 134/6 |
| 5,547,583 | A | | 8/1996 | Alexander |
| 5,613,238 | A | * | 3/1997 | Mouk et al. ............. 588/1 |
| 5,695,608 | A | * | 12/1997 | Yagi et al. ............. 162/135 |
| 5,763,734 | A | | 6/1998 | Nachtman et al. |
| 5,839,079 | A | | 11/1998 | Benson et al. |
| 6,203,624 | B1 | | 3/2001 | Bargues et al. |
| 6,465,706 | B1 | | 10/2002 | Rogers et al. |
| 6,504,077 | B1 | | 1/2003 | Purohit et al. |

OTHER PUBLICATIONS

Avila et al. "SSI and SKI's Review of SKB's Updated Final Safety Report for SFR 1", Oct. 2003, p. 72.*
Baston, G. M., et al., "Sorption of Plutonium and Americium on Repository, Backfill, and Geological Materials Relevant to the JNFL Los-Level Radioactive Waste Repository at Rokkasho-Mura", *Mat. Res. Soc. Symp. Proc.*, vol. 353, (1995), 957-964.
Bourbon, X., et al., "Influence of Organic Degradation Products on the Solubilisation of Radionuclides in Intermediate and Low Level Radioactive Wastes", *Radiochimica Acta*, vol. 74, (1996), 314-319.
Ebbs, S. D., et al., "Phytoextraction of Cadmium and Zinc from a Contaminated Soil", *J. Environmental Quality*, vol. 26, (Sep./Oct. 1997), 1424-1430.
Ebbs, Stephen D., et al., "Role of Uranium Speciation in the Uptake and Translocation of Uranium by Plants", *Journal of Experimental Botany*, vol. 49, No. 324, (Jul. 1998), 1183-1190.
Fanger, Gabriella, et al., "Project SAFE Complexing Agents in SFR", *Swedish Nuclear Fuel and Waste Management Company Report R-01-04*, (2001).
Francis, A. J., et al., "Remediation of Soils and Wastes Contaminated with Uranium and Toxic Metals", *Environ Sci. Technol.* vol. 32, (1998), 3993-3998.
Greenfield, B. F., et al., "The Identification and Degradation of Isosaccharinic Acid, A cellulose Degradation Product", *Mat. Res. Soc. Symp. Proc.*, vol. 353, 1151-1158.
Holgersson, Stellan, et al., "Effects of Gluco Isosaccharinate on Cs, Ni, Pm, and Th Sorption Onto and Diffusion into Cement", *Radiochim. Acta*, vol. 82, (1998), 393-398.
Moreton, Anthony D., "Thermodynamic Modelling of the Effect of Hydroxycarboxylic Acids on the Solubility of Plutonium at High pH", *Mat. Res. Soc. Symp. Proc.*, vol. 294, (1993), 753-758.
Rai, Dhanpat, et al., "The Influence of Isosaccharinic Acid on the Solubility of Np(IV) Hydrous Oxide", *Radiochim. Acta*, vol. 83, (1998), 9-13.
Rai, Dhanpat, et al., "Thermodynamic Model for the Solubility of PuO2(am) in the Aqueous Na+-OHÂ?CIÂ?H2O-ethylenediaminetetraacetate System", *Radiochim. Acta*, vol. 89, (2001), 67-74.
Van Loon, L. R., et al., "Sorption of Isosaccharinic Acid, a Cellulose Degradation Product, on Cement", *Environmental Science & Techonolgy*, vol. 31, No. 4 (1997), 1243-1245.
Vercammen, Karlien, et al., "Complexation of Calcium gby alpha-Isosaccharinic Acid under Alkaline Conditions", *Acta Chemica Scandinavica*, vol. 53, (1999), 241-246.
Vercammen, K., et al., "Complexation of Th(IV) and Eu(III) by alpha-isosaccharinic Acid Under Alkaline Conditions", *Radiochim. Acta*, vol. 89, (2001), 393-401.

(Continued)

*Primary Examiner*—William K Cheung
(74) *Attorney, Agent, or Firm*—Robert D. Watson

(57) ABSTRACT

A method for containing at least a portion of radioisotopes, radionuclides, heavy metal or combination thereof contaminating a substrate wherein a containment composition is applied to the substrate. The ingredients within the containment composition interact with the contaminants on the surface of the substrate until the containment composition has polymerized to a water insoluble form containing at least a portion of the contaminates enmeshed therein. The dried composition is removed from the contaminated surface removing with the composition at least a portion of the contaminate.

5 Claims, 4 Drawing Sheets

OTHER PUBLICATIONS

Vercammen, K., et al., "Evidence for the Existence of Complexes Between Th(IV) and alpha-Isosaccharinic Acid under Alkaline Conditions", *Radiochim. Acta*, vol. 84, (1999),221-224.

Whistler, Roy L., et al., "Textbook: Methods in Carbohydrate Chemistry, vol. II Reactions of Carbohydrates", *Academic Press, Inc.*, (1963),477-479.

Wieland, E., et al., "Immobilisation of Strontium, Nickel and Iodide by a Sulphate-Resisting Portland Cement", *Radiochemical Conference, Czech Republic*, (1998),388.

Wieland, E., et al., "Scientific Basis for Nuclear Waste Management XXI", *Symposium Sep. 28-Oct. 3, 1997, Davos, Switzerland; Materials Research Society Symposium*, vol. 506, (1998),573-578.

* cited by examiner

STRIPPABLE CONTAINMENT AND DECONTAMINATION COATING COMPOSITION AND METHOD OF USE

STATEMENT OF GOVERNMENT INTEREST

The United States Government has rights in this invention pursuant to Department of Energy Contract No. DE-AC04-94AL85000 with Sandia Corporation.

BACKGROUND

This invention relates generally to a containment and decontamination composition and methods of using the same.

Release of hazardous and potentially toxic contaminates into the environment is a potential threat to people, buildings and nature. It is important to contain contaminates such as radioisotopes, radionuclides or heavy metals that are released through unintentional or intentional activity to prevent further spread of the contaminates. It is also important to decontaminate contaminated items thereby restoring the items to their uncontaminated previous state.

Methods for removing contaminates from a substrate using physical or chemical methods are known. In general, these methods and compositions use toxic compounds, produce secondary by-products which are harmful to the environment, are expensive to use, and utilize specialized and cumbersome clean up equipment.

An environmentally friendly containment and decontamination composition that when applied to a contaminated surface (and or removed), protects people, animals and property from the further spread of the contamination would be very useful.

SUMMARY OF THE INVENTION

For ease of explanation, the present invention is explained below in terms of a containment and decontamination composition as applied to remove contaminates such as radioactivity from the surface and or subsurface of a substrate. One aspect of the present invention provides for methods of using a containment and decontamination composition as a coating to isolate the radioactive materials from the environment and prevent its migration by the elements. Another aspect of the present invention provides for methods of using the composition to decontaminate a contaminated surface. According to one embodiment of the present invention, a containment and decontamination composition solubilizes contaminates on a substrate thereby facilitating the removal of the contaminates from the substrate. According to another embodiment of the present invention, a containment and decontamination composition will adhere to or absorb the radioactive materials into the dried composition such that upon removal at least a portion of the radionuclides will be removed with the composition. These descriptions are illustrative only and should not be viewed as limiting.

According to one aspect of the present invention, a containment and decontamination composition is applied to the surface of a substrate which is contaminated by radioisotopes, radionuclides, heavy metals or a combination thereof (collectively contaminates) but not limited thereto. A decontamination composition applied to a substrate, wets a surface and dissolves radionuclides on a surface and subsurface of the substrate thereby mixing with, solubilizing, and or otherwise bringing the contaminates into a decontamination composition thereby facilitating cleanup. Removal of the decontamination composition includes removal of the wet composition with a wet/dry vacuum system and or stripping a dried composition from a substrate.

According to one aspect of the present invention, a containment and decontamination composition is applied to the surface of a substrate which is contaminated by radioisotopes, radionuclides, heavy metals or a combination thereof (collectively contaminates) but not limited thereto. The composition comprises about 0.001-20 wt % of an enhancer, about 1-50 wt % of a polymer and a carrier. A carrier includes an aqueous carrier such as water, a non aqueous carrier such as silicon oxide, or a solvent. A polymer includes water soluble polymer, water insoluble polymers or a mixture of the two. The composition forms a removable coating when the composition dries. For example the dried composition may be stripped from the substrate.

According to one aspect of the present invention, a containment and decontamination composition is applied to the surface of a substrate which is contaminated by radioisotopes, radionuclides, heavy metals or a combination thereof (collectively contaminates) but not limited thereto. The composition comprises about 0.001-20 wt % of an enhancer, about 1-50 wt % of a water insoluble polymer. The composition forms an emulsion or dispersion when mixed with water. The composition forms a strippable coating when the composition dries.

Yet another aspect of the present invention is a containment and decontamination composition which is about 0.01-20 wt % of a chelating agent, about 0.01-20 wt % of a placticizing agent, about 0.01-20 wt % of an inorganic complexant, about 1-20 wt % of a water soluble polymer, about 0.01-20 wt % of a crosslinker and a carrier. A composition as described forms a removable coating when the composition dries. A removable coating is suitable for stripping from the substrate wherein the stripped coating contains at least a portion of the contaminates enmeshed within the polymer matrix of the coating.

Yet another aspect of the present invention is a containment and decontamination composition comprising about 0.01-20 wt % of a chelating agent selected from the group consisting of citric acid, isosaccharinic acid, oxalic acid, ethylene-di-amine-tetra-acetic acid, lactic acid, acetic acid and soluble salts thereof, about 0.01-20 wt % of a water soluble polymer selected from the group consisting of poly (ethylene oxide), poly (ethylene glycol), poly (propylene glycol), and poly (vinyl alcohol) or a combination thereof. The composition forms a strippable coating when the composition dries.

Yet another aspect of the present invention comprises a method for removing at least a portion of contaminates on a surface and or subsurface of a substrate by applying a composition to the surface of a substrate Yet another aspect of the present invention comprises a method for containing at least a portion of contaminates on a surface of a substrate by applying the containment composition to the surface of a substrate. The composition solubilizes at least a portion of the contaminates into the composition. The composition is removed and in so doing, at least a portion of the contaminates having been solubilized by the composition are also removed from the substrate. According to one aspect of the present invention, the composition is removed before it dries. According to another aspect of the present invention, the composition is removed after is has dried.

Still another aspect of the present invention comprises a method for at least partially decontaminating a contaminated surface of a substrate using a strippable coating. A composition containing a polymer is applied to the surface of the contaminated substrate and the decontamination composition interacts with the contaminates on the surface and subsurface of the substrate. The containment and decontamination composition is allowed to dry to a water insoluble form thereby forming a strippable coating that is suitable for stripping from the substrate. The water insoluble form contains the contaminates enmeshed therein. According to one aspect of the present invention, the dried composition forms a strippable coating. The strippable coating is removed from the surface of the substrate along with at least a portion of the contaminates located on the surface and or subsurface of the substrate.

Yet another aspect of the present invention provides a physical barrier between the contaminated substrate and the environment to prevent further migration of the contaminate into the environment.

Another aspect of the present invention provides a composition for containing radioactivity to the site of the initial contamination.

Yet another aspect of the present invention provides for decontamination of a contaminate from a surface and subsurface of a substrate.

Still another aspect of the present invention provides for a composition for decontaminating radioactivity from the surface and subsurface of a substrate.

Another aspect of the present invention provides for minimizing the waste generated as a result of decontaminating a site.

DETAILED DESCRIPTION OF THE INVENTION

Figure 1:
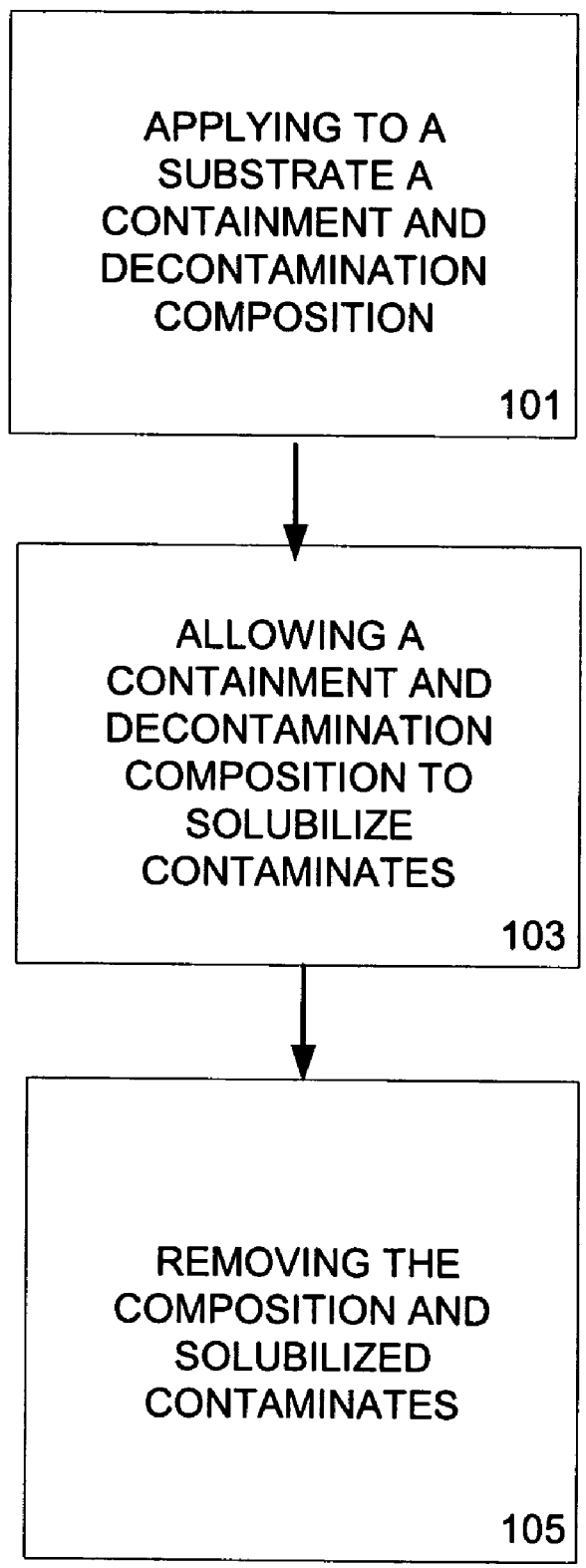
FIG. 1 illustrates a method of containing contaminates on the surface or subsurface of a substrate according to one embodiment of the present invention

According to one embodiment of the present invention, a containment and decontamination composition comprises about 0.001 wt % to about 20 wt % of an enhancer, and about 1 wt % to about 50 wt % of a water soluble polymer. Optionally, about 1 wt % to about 50 wt % of a water insoluble polymer is added. The water soluble polymer is selected from the group consisting of poly (ethylene oxide), poly (ethylene glycol), poly (propylene glycol), and poly (vinyl alcohol). In a preferred embodiment, the water soluble polymer ranges from about 5 wt % to about 20 wt %.

An enhancer is selected from a chelating agent, a plasticizing agent, a crosslinking agent, an inorganic complexant, a colored pigment, or any combination thereof. Suitable chelating agents are citric acid, isosaccharinic acid, oxalic acid, ethylene-diamine-tetra-acetic acid, lactic acid, acetic acid and soluble salts thereof but are not limited thereto. In a preferred embodiment, chelating agents within the composition range from about 5 wt % to about 10 wt %. Suitable plasticizing agents are poly (propylene glycol), poly (ethylene oxide), poly (ethylene glycol), butyl phthalate, ethyl phthalate, glycerin, glycerol, triethanolamine and urea but not limited thereto. In a preferred embodiment, plasticizing agents within the composition range from about 0.01 wt % to about 20 wt %. Suitable crosslinking agents are borates, aldehydes and isocyanates but not limited thereto. In a preferred embodiment, crosslinking agents within the composition range from about 0.01 wt % to about 10 wt %. Suitable inorganic complexants are ammonium salts, carbonates, nitrates, sodium chloride, and non-radioactive elements but not limited thereto. In a preferred embodiment, inorganic complexants within the composition range from about 0.01 wt % to about 10 wt %. Colored pigment within the composition ranges from about 0.01 wt % to 10 wt %.

According to another embodiment of the present invention, a composition comprises about 0.05 wt % to about 10 wt % of a chelating agent wherein, the chelating agent is selected from the group consisting of citric acid, isosaccharinic acid, oxalic acid, ethylene-diamine-tetra-acetic acid, lactic acid, acetic acid and soluble salt, about 0.05 wt % to about 10 wt % of a plasticizer agent wherein, the plasticizer agent is selected from the group consisting of propylene glycol, glycerin, glycerol, triethanolamine amino and urea, about 0.05 wt % to about 10 wt % of an inorganic complexant wherein, the inorganic complexant is selected from the group consisting of ammonium salts, carbonates, nitrates, sodium chloride, and non-radioactive elements, about 0.05 wt % to about 10 wt % of a crosslinker wherein, the crosslinker is selected from the group consisting of isocyanates, borates and aldehydes, and a water soluble polymer comprising about 1 wt % to about 10 wt % of a water soluble polymer wherein, the polymer is selected from the group consisting of poly (ethylene oxide), poly (ethylene glycol), poly (propylene glycol), poly (vinyl alcohol). In a preferred embodiment, a containment and decontamination composition comprises about 10 wt % poly (vinyl alcohol); and about 4 wt % ISA and salts thereof.

In a further preferred embodiment, a containment and decontamination composition comprises about 10 wt % poly (vinyl alcohol); and about 5 wt % isosaccharinic acid and salts thereof, about 5 wt % propylene glycol, about 5 wt % glycerin, about 5 wt % ammonium chloride, and about 4 wt % sodium borate in a carrier. The pH of this composition ranges from about 7.5 to about 8.0 with a preferred pH of about pH 7.8.

Yet another embodiment of the present invention comprises about 0.001-20 wt % of an enhancer, about 1-50 wt % of a water insoluble polymer and a carrier. The composition forms a suspension or emulsion in an aqueous medium such as water and dries to a strippable coating. Alternatively, the composition forms a suspension in silicon oxide and dries to a strippable coating.

The water insoluble polymer is natural rubber latex or synthetic latex. The enhancer is a colored pigment, an inorganic complexant, a viscosing agent, a surfactant, a crosslinking agent, a chelating agent or any combination thereof. Suitable chelating agents are citric acid, isosaccharinic acid, oxalic acid, ethylene-diamine-tetra-acetic acid, lactic acid, acetic acid and soluble salts thereof but are not limited thereto. In a preferred embodiment, a chelating agent within the composition ranges from about 5 wt % to about 10 wt %. Suitable plasticizing agents are poly (propylene glycol), poly (ethylene oxide), poly (ethylene glycol), butyl phthalate, ethyl phthalate, glycerin, glycerol, triethanolamine and urea but not limited thereto. In a preferred embodiment a plasticizing agent within the composition ranges from about 0.01 wt % to about 20 wt %. Suitable crosslinking agents are borates, aldehydes and isocyanates but not limited thereto. In a preferred embodiment, a crosslinking agent within the composition ranges from about 0.01 wt % to about 10 wt %. Suitable inorganic complexants are ammonium salts, carbonates, nitrates, sodium chloride, and non-radioactive elements but not limited thereto. In a preferred embodiment, colored pigments within the composition range from about 0.01 wt % to about 10 wt %. In a preferred embodiment, viscosing agents within the composition range from about 0.01 wt % to about 10 wt %. In a preferred embodiment, surfactants within the composition range from 0.001 wt % to about 10 wt %. The composition forms a removable coating when the composition dries. In a most preferred embodiment, the composition comprises about 1 to about 20 wt % of natural or synthetic latex rubber, and about 1 to about 10 wt % of TEA.

In another embodiment of the present invention, a containment and decontamination composition comprises about 0.001 wt % to about 20 wt % of an enhancer; about 1 wt % to about 50 wt % of a water soluble polymer; and about 1 wt % to about 50 wt % of a water insoluble polymer. In a preferred embodiment, the water soluble polymer comprises polyvinyl alcohol in the range from about 1 wt % to about 20 wt %, the water insoluble polymer comprises natural or synthetic latex rubber in ammonia solution in the range from about 1 wt % to about 20 wt %; and the enhancer comprises citric acid in the range from about 0.01 wt % to about 10 wt %, isosaccharinic acid in the range from about 0.01 wt % to about 10 wt %, ammonium thiocyanite in the range of about 0.01 wt % to about 10 wt %, ammonium chloride in the range from about 0.01 wt % to about 20 wt %, potassium chloride in the range from about 0.01 wt % to about 10 wt %; surfactant in the range from about 0.1 wt % to about 1 wt %, methyl cellulose in the range from about 0.01 wt % to about 10 wt %, hydroxymethyl cellulose in the range from about 0.01 wt % to about 10 wt %, triethanolamine in the range from about 0.01 wt % to about 20 wt % and a carrier.

Another embodiment of the present invention is a method for removing at least a portion of contaminates found on a substrate. A composition is applied to the surface of the substrate. The ingredients of the composition interact with contaminates on the substrate with at least a portion of the contaminates being solubilzed by the composition. The solubilized contaminates are removed, for example by a wet/dry vacuum.

Yet another embodiment of the present invention is a method for at least partially containing a contaminate on a substrate. The method includes applying a composition to a substrate. The composition is allowed to dry to a water insoluble form. The dried composition holds the contaminates in place until the composition is removed.

Still another embodiment of the present invention is a containment and decontamination kit. The kit comprises a water soluble polymer suitable for forming a strippable coating, and an enhancer that aids in the solubilization of a contaminate.

Another embodiment of the present invention is a method for at least partially removing contaminates from a contaminated substrate. The method includes the steps of allowing a composition to dry on the contaminated substrate. Once the composition dries, the composition forms a water insoluble strippable coating wherein at least a portion of the contaminates are enmeshed within the water insoluble strippable coating. The water insoluble strippable coating is removed from the substrate thereby at least partially decontaminating from the surface of the substrate the contaminates.

Another embodiment of the present invention is a containment and decontamination kit. The kit comprises a water insoluble polymer suitable for forming a strippable coating when the composition dries, and an enhancer that aids in the solubilization of a contaminate.

Referring now to FIG. 1, a method for containing a contaminate on the surface of a contaminated substrate is illustrated according to one embodiment of the present invention. A composition is applied to the surface of a contaminated substrate 101. The composition is applied to any substrate. The substrate is an animate object such as a person, plant, or animal, or an inanimate object such as a building or car. Examples of substrate surfaces upon which the composition is applied include, skin, dirt, grass, steel, asphalt, varnished wood, wood, marble, granite, concrete, tile, plastic, glass or combinations thereof although this is not meant as a limitation. A composition interacts with contaminates on a substrate 103. At least a portion of the contaminates are solubilized and or mobilized into the composition thereby at least partially decontaminating a substrate. The composition and solubilzed contaminates are removed from the substrate for example with a wet/dry vacuum 105. Alternatively, the composition dries to a water insoluble form enmeshing contaminates therein.

Application of a containment and decontamination composition to the surface of a substrate is achieved through a variety of means such as spraying, brushing, hosing, pouring, spreading or submersing. The individual components of the composition are applied separately in solid or liquid form and combined on the application surface.

Figure 2:
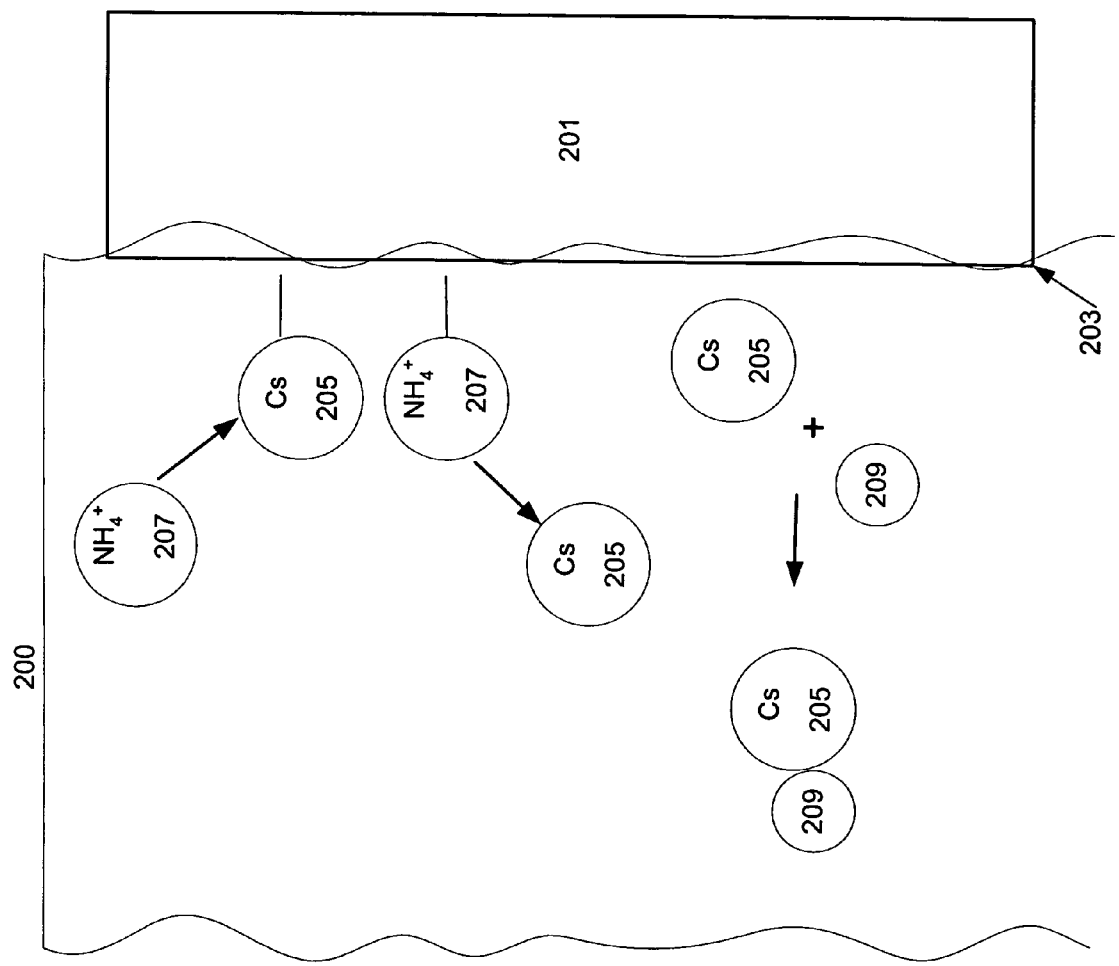
FIG. 2 illustrates a composition coated on the surface or subsurface of a substrate interacting with contaminates located thereon according to one embodiment of the present invention

Referring now to FIG. 2, an applied composition 200 interacts with contaminates 205 on a surface 203 and subsurface of a substrate 201 according to one embodiment of the present invention. One contaminate illustrated in 205 is cesium but a contaminate could be any radioisotope, radionuclide, heavy metal or combination thereof. A contaminate, for example cesium, is scattered about the surface of a substrate along with other surface grime or bound to a surface of a substrate. Contaminates bound to a surface are liberated therefrom by, for example, ion exchange between a non hazardous molecule 207 and a bound contaminate 205 wherein 207 is illustrated as ammonium. A liberated contaminate interacts with enhancers 209 within a composition. Enhancer 209 is a sorption agent that complexes with a contaminate 205 and thereby holds contaminate 205 within the composition for removal. Examples of sorption agents are hydroxyapatite, natural apatite, bone char or raw or dried bone, clays, radionuclide sorbents or ion exchange solids, and resins.

Figure 3:
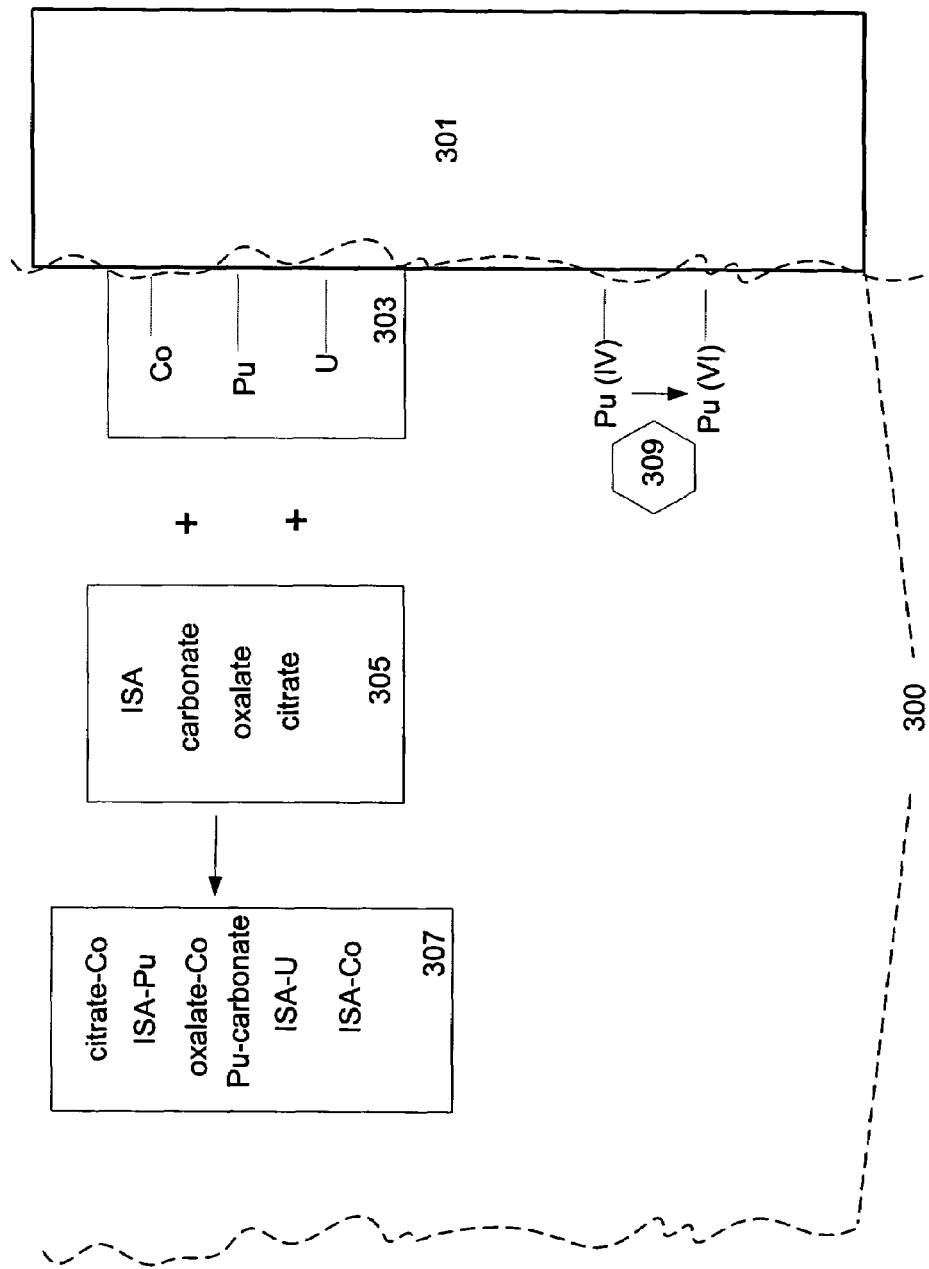
FIG. 3 illustrates the interaction of enhancers within a composition coated onto the surface or subsurface of a contaminated substrate according to one embodiment of the present invention

Referring now to FIG. 3, enhancers within the containment and decontamination composition 300 act to increase the solubility of the contaminate 303 in a composition according to one embodiment of the present invention. Contaminates as illustrated in FIG. 3 are plutonium (Pu), cobalt (Co), and uranium (U). Chelating agents 305 complex with a contaminate 303 and forms a chelate 307. The chelate is more soluble than a contaminate alone. Oxidizing agents 309 change an oxidation state of a contaminate 303 to a more soluble form. For example, when a contaminate is an actinide such as Pu, an oxidizing agent will change the oxidation state of Pu (IV) from its less soluble form of Pu (IV) to a more soluble Pu (VI) species thereby increasing the contaminates mobility into a liquid phase of a containment and decontamination composition. Hydrogen peroxide is an example of a suitable oxidizing agent. Surfactants within a composition (not shown) also act to increase the solubility of contaminates thereby further increasing the contaminate's mobility into a containment and decontamination composition.

A containment and decontamination composition is applied in liquid, aerosol, emulsion, foam, gel, or sol phase or any combination thereof. Alternatively, two or more components are added to a substrate separately and mixed upon the contaminated substrate.

According to another embodiment of the present invention, components of a composition are combined on a substrate. This is useful when a contaminate is dispersed in a liquid or found within a liquid. After the individual components are added to the liquid containing the contaminates, the components mix together within the contaminated liquid to form a containment and deontamination composition. In another embodiment, the components of a composition are premixed prior to application on a substrate.

Containment and decontamination compositions or components thereof are applied to the surface of a substrate by a variety of application means such as brushing, spraying, hosing, pouring, or spreading.

Removing the polymerized containment composition is accomplished by hand or with the aid of a mechanical means such as a scrapper. Alternatively, the composition is removed from the surface of a substrate remotely for example using the force of a jet of water.

Figure 4:
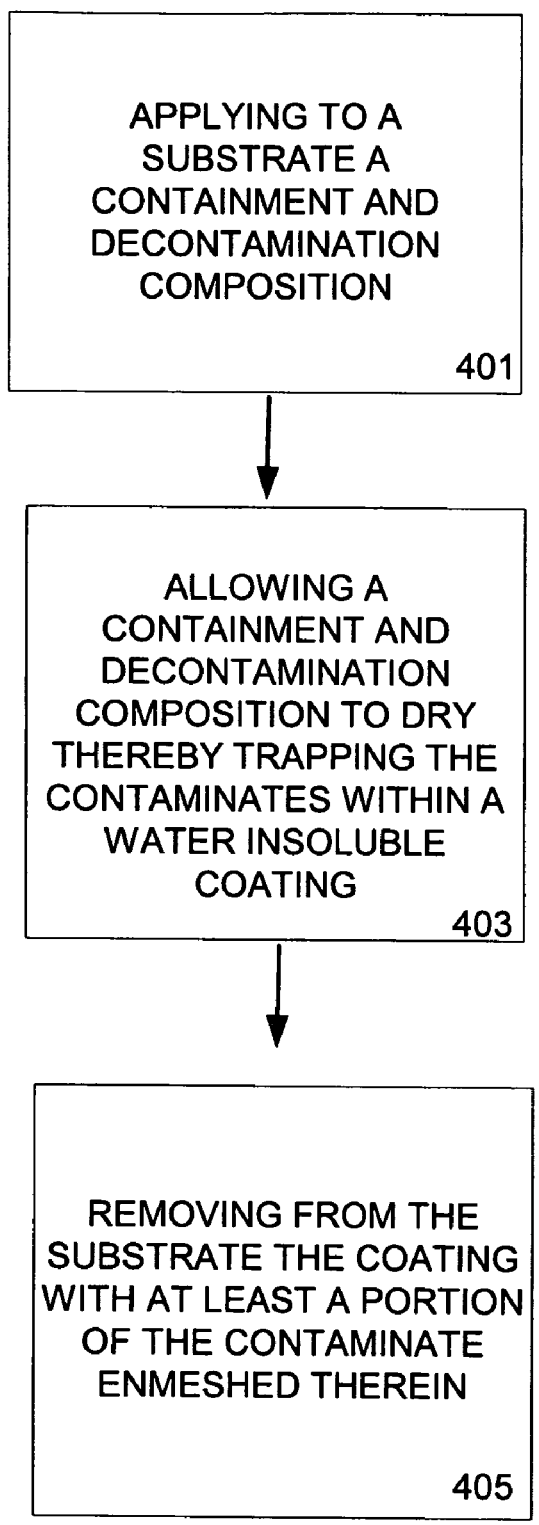
FIG. 4 illustrates a method of decontaminating a surface or subsurface of a substrate according to one embodiment of the present invention

Referring now to FIG. 4, a method for decontaminating a substrate is illustrated according to one embodiment of the invention. A composition is applied to a contaminated substrate 401. The ingredients within the composition are allowed to interact with the contaminate 403. A decontamination composition covers a surface of a substrate in addition to the cracks, crevices and pores of a subsurface. A composition is allowed to dry and polymerize into a dried form 405. As a composition dries or polymerizes, the solubilized contaminates are mobilized into the polymerizing composition. A dried composition forms a strippable coating or water insoluble polymer having a portion of the contaminate encased therein. Since the dried composition is water insoluble, the contaminates enmeshed within the dried composition will not be spread by the activities of man, animal or nature. A polymerized composition is stripped from a surface of a substrate and disposed of thereby further decontaminating a substrate's surface 405.

According to one embodiment, a containment and decontamination composition removes contaminates from vertical surfaces, horizontal surfaces or surfaces made up of a combination thereof. The viscosity of a composition is varied with viscosing agents. Compositions in accordance with various preferred embodiments have a pH of between 6-9.

Another embodiment of the present invention is a containment and decontamination composition comprising a polymer. A polymer of the composition is water soluble, water insoluble or a combination thereof when multiple polymers are present. When the polymer is allowed to dry, a water insoluble coating for containment and decontamination is formed Another embodiment of the present invention is a containment and decontamination composition comprising a polymer and at least one enhancer. An enhancer is selected from groups I-V as discussed below. When a polymer and enhancer are combined, a containment and decontamination composition is formed that will polymerize and dry to a water insoluble coating.

A polymer that forms a coating system is water-soluble, water-insoluble or a combination thereof. Examples of suitable polymers for the coating system include, poly (ethylene oxide), poly (ethylene glycol), and poly (propylene glycol), poly (vinyl alcohol), poly ethylene oxide, poly propylene glycol, vinyl acetate, poly vinyl acetate, polyvinyl butyrol, poly acetate-ethylene polymer, ethylene-vinyl chloride polymer, vinyl acetate homopolymer, natural rubber latex and synthetic latex. The examples provided are intended for illustrative purposes and do not limit the scope of the invention since other suitable polymers will be apparent to one of ordinary skill in the art.

According to other embodiments of the present invention, containment and decontamination compositions are applied as a solution, emulsion, dispersion, foam, gel, hydrogel, and aerosol. The components of the composition are applied separately and mixed on the substrate. In preferred embodiments, the components are mixed just prior to application onto the substrate.

Group I enhancer include plasticizers which when added to a containment and decontamination composition increase or decrease the strength, ductility, ease of application and adhesion to the contaminated surface of a substrate being treated with the containment and decontamination composition. Examples of suitable plasticizers include glycols (for example propylene glycol, poly (ethylene glycol), propylene glycol diacetate, glycerin, glycerol, poly (ethylene oxide), amines (for example, ethylene-diamine-tetra-acetic acid (EDTA), monoethanolamine, diethanolamine and triethanolamine (TEA)), and urea. The examples provided are intended for illustrative purposes and do not limit the scope of the invention since other suitable plasticizers will be apparent to one of ordinary skill in the art.

Group II enhancers include solubilizing agents which when added to a containment and decontamination composition facilitate at least partial solubilization of contaminate on the surface of the substrate. Examples of solubilizing agents include ion exchange molecules, organic and inorganic chelators, oxidizers and surfactants. More specifically, citric acid, isosaccharinic acid, oxalic acid, ethylene-diamine-tetra-acetic acid (EDTA), lactic acid, acetic acid and esters and salts thereof, carbonates, nitrates, salts of the ammonium ions, sodium ions, chloride ions, non-radioactive elements such as Cs and Co. The examples provided are intended for illustrative purposes and do not limit the scope of the invention since other suitable solubilizing agents will be apparent to one of ordinary skill in the art.

Group III enhancers include surfactants which are added to a containment and decontamination composition to modify the properties of the surface tension, adhesion and ease of application and contaminate uptake by the composition. Surfactants are selected from anionic, cationic, nonionic, amphoteric or combinations thereof. Examples of a surfactant are DOW's® super wetting agent, sodium lauryl sulfate, and sodium dodecylsulfate. The examples provided are intended for illustrative purposes and do not limit the scope of the invention since other suitable surfactants will be apparent to one of ordinary skill in the art.

Group IV enhancers include sorbents which are added to a containment and decontamination composition to increase the effectiveness of the strippable coating for decontamination and immobilization of contaminates. Examples of sorbents include hydroxyapatite, natural apatite, bone char, or raw or dried bone, clays, radionuclide sorbents or ion exchange solids, and resins. The examples provided are intended for illustrative purposes and do not limit the scope of the invention since other suitable sorbents will be apparent to one of ordinary skill in the art.

Group V enhancers include chemical agents to modify: surface tension (such as low molecular weight alcohols), thickness and density of a composition (such as methyl cellulose, hydroymethyl cellulose), adhesion of composition to substrate (such as extenders), curing time, strength, and color. The examples provided are intended for illustrative purposes and do not limit the scope of the invention.

Additionally strong or weak acids and/or bases or pH buffer systems are added to increase the effectiveness of the strippable coating. The pH of a composition ranges from about pH 6 to about pH 9.

Yet another embodiment of the present invention is a containment and decontamination composition that upon drying forms a strippable coating wherein the composition comprises: about 10 wt % poly (vinyl alcohol), about 0.01 wt % to about 10 wt % isosaccharinic acid and salts thereof, about 5 wt % propylene glycol, about 0.1 wt % to about 10 wt % glycerin, about 0.01 wt % to about 10 wt % ammonium chloride, about 0.01 wt % to about 10 wt % sodium borate and a carrier, at a pH of between about 7.5 to 8.0.

Yet another embodiment of the present invention is a composition comprising poly (vinyl alcohol) in the range of about 5 wt % to about 20 wt %, citric acid in the range of about 0.01 wt % to about 10 wt %, isosaccharinic acid in the range of about 0.01 wt % to about 10 wt %, ammonium thiocyanite in the range of about 0.01 wt % to about 10 wt %, potassium chloride in the range of about 0.01 wt % to about 10 wt %, DOW® superwetting agent in the range of about 0.001 wt % to about 1 wt %, methyl cellulose in the range of about 0.01 wt % to about 10 wt %, TEA in the range from about 0.01 wt % to about 20 wt %, sodium borate in the range from about 0.01 wt % to about 10 wt % and a carrier.

Yet another embodiment of the present invention is a composition comprising natural or synthetic latex rubber in ammonia solution in the range from about 1 wt % to about 20 wt %, TEA in the range from about 1 wt % to about 10 wt % and a carrier.

Still another embodiment of the present invention is a composition comprising polyvinyl alcohol in the range from about 1 wt % to about 20 wt %, natural or synthetic latex rubber in ammonia solution in the range from about 1 wt % to about 20 wt %, citric acid in the range from about 0.01 wt % to about 10 wt %, isosaccharinic acid in the range from about 0.01 wt % to about 10 wt %, ammonium thiocyanite in the range of about 0.01 wt % to about 10 wt %, ammonium chloride in the range from about 0.01 wt % to about 20 wt %, potassium chloride in the range from about 0.01 wt % to about 10 wt %, DOW® superwetting agent in the range from about 0.001 wt % to about 1 wt %, methyl cellulose in the range from about 0.01 wt % to about 10 wt %, hydroxymethyl cellulose in the range from about 0.01 wt % to about 10 wt %, TEA in the range from about 0.01 wt % to about 20 wt % and a carrier.

EXAMPLE 1

In these examples, an organic chelating agent for complexing with a contaminate are illustrated. Organic chelating agents refer to molecules such as citric acid, isosaccharinic acid, oxalic acid, ethylene-diamine-tetra-acetic acid (EDTA), lactic acid, acetic acid and soluble salts thereof. For example, isosaccharinic acid or salts thereof (ISA) is added to a decontamination composition wherein ISA has the general formula I.

$$C_5H_{11}O_4COO^- \qquad (I)$$

ISA is an organic chelating agent that is water soluble. ISA complexes with radioisotopes, radionuclides or heavy metals defined as ($An^{x+}$) and increases the solubility of an $An^{x+}$ in water. The complexation reaction is visualized as:

$$C_5H_{11}O_4COO^- + An^{x+} \rightarrow C_6H_8O_3COOAn^{(x-1)+} \qquad (1)$$

Coupons of asphalt singles and steel are contaminated by placing 0.1 ml of either a plutonium (Pu) or uranium (Ur) solution onto the surface of the coupon. The surfaces of the coupons are air dried and placed in glass beakers containing either 100 ml of water; or about 5 wt % Na-ISA in water; or about 5 wt % sodium citrate in water; or about 5 wt % ETDA in water, all at an initial pH of 6.0. The solutions are gently agitated and aliquots are removed from the samples for liquid scintillation counting. The results are illustrated in Table 1 and Table 2.

Referring now to Table 1, an aqueous solution of about 5 wt % ISA removes about 41% of the total Pu placed upon the surface of the asphalt coupon. An about 5 wt % EDTA solution in water removes about 24%.

TABLE 1

| Decontamination agent | Initial Pu on sample µCi | Pu is solution after 15 min. µCi/ml | Pu is solution after 30 min. µCi/ml | Total % of Pu removed by decon agent |
|---|---|---|---|---|
| Water | 6 | 0 | 0 | 0 |
| 5% EDTA solution | 6 | .164 | .246 | 24.6% |
| 5% ISA solution | 6 | .254 | .412 | 41.2% |

Referring now to Table 2, the results illustrate than an aqueous solution of about 5 wt % ISA removes about 15% of the total U(IV) radioactivity placed upon the surface of the steel coupon. An aqueous solution of about 5 wt % ISA removes about 92% of the total U(VI) placed upon the surface of the steel coupon.

TABLE 2

| | Conc. of U in solution 15 min. | Conc. of U in solution 30 min. | Conc. of U in solution 45 min. | Conc. of U in solution 60 min. | % U removed |
|---|---|---|---|---|---|
| U(IV) | | | | | |
| Water | 1.68 | 2.91 | 3.01 | 2.19 | <1% |
| 5% citrate solution | 3 | 6 | 8.7 | 11.3 | 2% |
| 5% ISA solution | 49.1 | 51.4 | 58 | 79.6 | 15% |
| U(VI) | | | | | |
| Water | 0 | 0 | 0 | 0 | 0 |
| 5% citric acid solution | 2.59 | 4.37 | 6.78 | 8.3 | 1% |
| 5% ISA solution | 226 | 269 | 403 | 419 | 92% |

EXAMPLE 2

In another set of experiments, preparations of a silicon based gel containing either about 5 wt % EDTA, about 5 wt % ISA or water were placed upon the steel or asphalt coupons and allowed to sit for about 15 minutes. The gels are removed from the coupons with a cotton wipe and the wipe is tested for Pu by liquid scintillation counting. The results from the decontamination experiment are illustrated in Table 3.

TABLE 3

| Surface | Decontamination agent | Initial Pu on surface | Pu in decon gel | % Decontamination |
|---|---|---|---|---|
| Steel | Water based gel only | 6 µCi | 0 µCi | 0% |
| Steel | 5% EDTA gel | 6 µCi | 3.3 µCi | 55% |
| Steel | 5% ISA gel | 6 µCi | 5.1 µCi | 85% |
| Wood | Water based gel only | 6 µCi | $1 \times 10^{-4}$ µCi | <1% |
| Wood | 5% EDTA gel | 6 µCi | 1.92 µCi | 32% |
| Wood | 5% ISA gel | 6 µCi | 2.45 µCi | 41% |

Referring now to Table 3, the silicon oxide gel of about 5 wt % ISA removes about 85% of the radioactivity from the surface of the steel coupon. Table 3 further illustrates that the silicon oxide gel of about 5 wt % ISA removes about 41% of the radioactivity from the wood coupon. A combination of chelating agents are added to the decontamination composition to produce an additive effect.

EXAMPLE 3

In another set of experiments, a containment and decontamination composition comprising: water, about 10 wt % poly (vinyl alcohol), about 5 wt % sodium isosaccharinate, about 5 wt % propylene glycol, about 5 wt % glycerin, about 5 wt % ammonium chloride, and about 4 wt % sodium borate, at about pH 7.8 is applied to the surface of steel, wood, and ceramic tile coupons which are contaminated with radioactive cobalt (Co), cesium (Cs) and uranium (Ur) of a known amount. The containment and decontamination composition dries to a mostly solid polymer in about one (1) hour. The dried containment and decontamination composition is water insoluble as defined by the following test. When coupons with the dried containment and decontamination composition on their surface are sprayed with water at a rate of about 10 cc/minute for about one (1) hour, none of the radionuclides are released from the dried containment and decontamination composition on the surface of the coupons. In contrast, an uncoated radioactive coupon lost about 20-60% of the radionuclide from the surface of the coupon when tested with water spray at the rate of about 10 cc/minute for about one (1) hour.

The dried containment and decontamination composition referred is stripped from the surface of the test coupons and the radioactivity retained by the dried containment and decontamination composition is determined with liquid scintillation counting. The results from the decontamination experiment are illustrated in Table 4.

TABLE 4

| Coupon | Radionuclide | % remaining on coupon after treatment | % removed by strippable coating |
|---|---|---|---|
| Steel | cobalt | 5 | 98 |
| Steel | cesium | 4 | 91 |
| Steel | uranium | 7 | 90 |
| Wood | cobalt | 3 | 92 |
| Wood | cesium | 2 | 95 |
| Wood | uranium | 5 | 87 |
| Ceramic tile | cobalt | 2 | 92 |
| Ceramic tile | cesium | 1 | 91 |
| Ceramic tile | uranium | 3 | 94 |

Referring now to Table 4, the results illustrate that about 90% or more of the radioactivity contributed from either Co, Cs, or Ur is removed from steel, wood and ceramic coupons. The percent radioactivity remaining on the steel, wood, or ceramic tile coupons is determined by washing the coupon using a strong acid and determining radionuclide concentration of the wash by gamma spectroscopy and liquid scintillation counting.

EXAMPLE 4

In a separate experiment, a composition of water and poly (vinyl alcohol) (10 wt %) (without any solubilizer) is applied to steel, wood and ceramic tile coupons contaminated with Co, Cs, or Ur and allowed to dry. The dried composition is removed from the coupon and the radioactivity counted using gamma spectroscopy and liquid scintillation counting. The results from the decontamination experiment are illustrated in Table 5.

TABLE 5

| Coupon | Radionuclide | % remaining on coupon after treatment | % removed by strippable coating without radionuclide solublizer |
|---|---|---|---|
| Steel | cobalt | 34 | 62 |
| Steel | cesium | 26 | 70 |
| Steel | uranium | 45 | 51 |
| Wood | cobalt | 39 | 61 |
| Wood | cesium | 30 | 54 |
| Wood | uranium | 62 | 33 |
| Ceramic Tile | cobalt | 33 | 59 |
| Ceramic Tile | cesium | 21 | 82 |
| Ceramic Tile | uranium | 51 | 38 |

Referring now to Table 5, the results illustrate that the percentage of radionuclide removed from the coupons by the dried containment and decontamination composition consisting of water and poly vinyl alcohol (10 wt %) decreases by up to 60% when there are no solubilizers in the containment and decontamination composition.

EXAMPLE 5

In another experiment, a water based containment and decontamination composition suitable for forming a strippable coating is prepared using natural rubber in a water-based emulsion with ammonia to preserve the emulsion, about 3 wt % citric acid, about 3 wt % isosaccharinic acid and about 1 wt % ammonium chloride and buffered to a pH of about 6.9 with sodium phosphate and sodium hydroxide. The composition is applied to steel and ceramic tile coupons and allowed to dry for about 1 hour. The dried containment and decontamination composition is water insoluble after 1 hour as defined by the following test. Water at a rate of about 10 cc/minute is sprayed onto the coupon for about one (1) hour. No radionuclide was released from the surface of the dried containment and decontamination composition on the coupons during this time. The coating formed by the dried containment and decontamination composition was stripped from the surface of the contaminated coupons and the radioactivity contained within the stribbable coating was counted using gamma spectroscopy and liquid scintillation counting. The results are illustrated in Table 6.

TABLE 6

| Coupon | Radionuclide | % remaining on coupon after treatment | % removed by strippable coating |
|---|---|---|---|
| Steel | cobalt | 12 | 93 |
| Steel | cesium | 2 | 90 |
| Ceramic tile | cobalt | 18 | 89 |
| Ceramic tile | cesium | 3 | 93 |

Referring now to Table 6, the results illustrate that about 89-93% of the radioactivity is removed from the coupons by the strippable coating. The percentage of contaminate remaining on the coupon is determined by washing the coupons with a strong acid solution. An aliquot of the acid solution wash is analyzed with gamma spectroscopy and liquid scintillation counting. The percentage of contaminate remaining on the coupon after the coating is removed was about 3-18%.

EXAMPLE 6

A containment and decontamination composition comprising natural rubber in a water-based emulsion with ammonia to preserve the emulsion, citric acid, isosaccharinic acid, ammonium chloride and buffered to a pH of about 6.9 with sodium phosphate and sodium hydroxide is applied to a coupon and allowed to dry for about one (1) hour. The dried containment and decontamination composition is water insoluble after one (1) hour as defined by the following test: water at a rate of about 10 cc/minute is sprayed onto the coupon for about one (1) hour. No radionuclide is released from the surface of the dried containment and decontamination composition on the coupons during this time. The coating formed by the dried containment and decontamination composition is stripped from the surface of the contaminated coupons and the radioactivity contained within the strippable coating is counted using gamma spectroscopy and liquid scintillation counting. The results are illustrated in Table 7.

TABLE 7

| Coupon | Radionuclide | % remaining on coupon after treatment | % removed by strippable coating without enhancer |
| --- | --- | --- | --- |
| Steel | cobalt | 43 | 55 |
| Steel | cesium | 69 | 43 |
| Ceramic tile | cobalt | 32 | 63 |
| Ceramic tile | cesium | 57 | 35 |

Referring now to Table 7, the results illustrate that about 35-63% of the radioactivity is removed from the coupons by the strippable coating without enhancers. The percentage of contaminate remaining on the coupon is determined by washing the coupons with a strong acid solution. An aliquot of the acid solution wash is analyzed with gamma spectroscopy and liquid scintillation counting. The percentage of contaminate remaining on the coupon after the coating is removed was about 32-69%.

EXAMPLE 7

In this example, decontamination of Cs contaminated coupons is illustrated for a decontamination composition comprising 3 wt % sodium citrate, 1 wt % $NH_4CO_3$, 5 wt % Isopropyl, 1 wt % sodium lauryl sulfate, at pH 7.0. Coupons of granite, marble or concrete are exposed to an initial Cs concentration of about 1000 $pCi/cm^2$. The coupons are pretreated with either water or decontamination solution that is applied to wet the surface of the contaminated coupon and thereby dissolve radionuclides present on the surface and in the pores and cracks of the materials. The decontamination composition or water is removed from the coupons with a wet vacuum treatment. All values are reported in counts per minute (cpm) taken 1" from the surface.

TABLE 8

| MATERIAL | PRETREATMENT | % DECONTAMINATION |
| --- | --- | --- |
| Concrete | Water | 36 |
| Granite | Water | 80 |

TABLE 8-continued

| MATERIAL | PRETREATMENT | % DECONTAMINATION |
| --- | --- | --- |
| Marble | Water | 84 |
| Concrete | Decontamination Composition | 52 |
| Granite | Decontamination Composition | 64 |
| Marble | Decontamination Composition | 100 |
| Concrete | Water | 44 |
| Granite | Water | 60 |
| Marble | Water | 80 |
| Concrete | Decontamination Composition | 28 |
| Granite | Decontamination Composition | 80 |
| Marble | Decontamination Composition | 100 |

Referring now to Table 8, an improved percent (%) decontamination is illustrated for coupons pretreated with a decontamination composition as compared to the % decontamination achieved with water alone. The improved decontamination was illustrated for concrete, granite and marble. Marble exhibited the best % decontamination with the decontamination composition.

The present invention has been described in terms of preferred embodiments, however, it will be appreciated that various modifications and improvements are made to the described embodiments without departing from the scope of the invention.

What is claimed is:

1. An aqueous containment and decontamination composition, capable of forming a strippable coating upon drying, consisting of:
    10 wt % poly (vinyl alcohol);
    5 wt % isosaccharinic acid and salts thereof;
    5 wt % propylene glycol;
    5 wt % glycerin;
    5 wt % ammonium chloride;
    4 wt % sodium borate; and
    66% water;
    wherein the pH of the composition ranges from 7.5 to 8.0.

2. A containment and decontamination composition capable of forming a strippable coating upon drying, consisting of:
    polyvinyl alcohol in the range from 1 wt % to 20 wt %;
    natural or synthetic latex rubber in ammonia solution in the range from 1 wt % to 20 wt %;
    citric acid in the range from 0.01 wt % to 10 wt %;
    isosaccharinic acid and soluble salts thereof in the range from 1 wt % to 10 wt %;
    ammonium thiocyanate in the range of 0.01 wt % to 10 wt %;
    ammonium chloride in the range from 0.01 wt % to 20 wt %;
    potassium chloride in the range from 0.01 wt % to 10 wt %;
    surfactant in the range from 0.1 wt % to 1 wt %;
    methyl cellulose in the range from 0.01 wt % to 10 wt %;
    hydroxymethyl cellulose in the range from 0.01 wt % to 10 wt %;
    triethanolamine in the range from 0.01 wt % to 20 wt %; and
    water.

3. A containment and decontamination composition, capable of forming a strippable coating upon drying, comprising:
    1 wt % to 20 wt % of natural or synthetic latex rubber;
    1 wt % to 10 wt % of isosaccharinic acid and soluble salts thereof;
    1 wt % to 10 wt % of triethanolamine; and
    water.

4. An aqueous containment and decontamination composition, capable of forming a strippable coating upon drying, consisting of:
   10 wt % poly (vinyl alcohol);
   1 wt % to 10 wt % isosaccharinic acid and salts thereof;
   5 wt % propylene glycol;
   0.1 wt % to 10 wt % glycerin;
   0.01 wt % to 10 wt % ammonium chloride;
   0.01 wt % to 10 wt % sodium borate; and
   water;
   wherein the pH of the composition ranges from pH 7.5 to pH 8.

5. An aqueous containment and decontamination composition, capable of forming a strippable coating upon drying, consisting of:
   polyvinyl alcohol in the range from 5 wt % to 20 wt %;
   citric acid in the range from 0.01 wt % to 10 wt %;
   isosaccharinic acid in the range from 1 wt % to 10 wt %;
   ammonium thiocyanate in the range of 0.01 wt % to 10 wt %;
   potassium chloride in the range from 0.01 wt % to 10 wt %;
   surfactant in the range from 0.001 wt % to 1 wt %;
   methyl cellulose in the range from 0.01 wt % to 10 wt %;
   triethanolamine in the range from 0.01 wt % to 20 wt %;
   sodium borate in the range from 0.01 wt % to 10 wt %; and
   water.

\* \* \* \* \*